US008819143B2

(12) United States Patent
Klein

(10) Patent No.: US 8,819,143 B2
(45) Date of Patent: Aug. 26, 2014

(54) PRESENTATION LAYER ADAPTATION IN MULTIMEDIA MESSAGING

(75) Inventor: Yonatan Klein, Tel Aviv (IL)

(73) Assignee: Flash Networks Ltd., Hertzlia (IL)

( * ) Notice: Subject to any disclaimer, the term of this patent is extended or adjusted under 35 U.S.C. 154(b) by 2343 days.

(21) Appl. No.: 11/442,966

(22) Filed: May 31, 2006

(65) Prior Publication Data

US 2007/0011256 A1    Jan. 11, 2007

Related U.S. Application Data

(60) Provisional application No. 60/685,541, filed on May 31, 2005.

(51) Int. Cl.
*G06F 15/16* (2006.01)

(52) U.S. Cl.
USPC .......................................................... 709/206

(58) Field of Classification Search
USPC .................................................. 709/203–206
See application file for complete search history.

(56) References Cited

U.S. PATENT DOCUMENTS

| | | | | |
|---|---|---|---|---|
| 2001/0040900 | A1* | 11/2001 | Salmi et al. | 370/487 |
| 2003/0110297 | A1* | 6/2003 | Tabatabai et al. | 709/246 |
| 2004/0242202 | A1* | 12/2004 | Torvinen | 455/412.1 |
| 2005/0091574 | A1* | 4/2005 | Maaniitty et al. | 715/500.1 |
| 2005/0111041 | A1* | 5/2005 | Salmi et al. | 358/1.18 |
| 2005/0114800 | A1* | 5/2005 | Rao | 715/867 |
| 2005/0143136 | A1* | 6/2005 | Lev et al. | 455/566 |
| 2005/0154741 | A1* | 7/2005 | Hebert et al. | 707/100 |
| 2005/0165913 | A1* | 7/2005 | Coulombe et al. | 709/219 |
| 2005/0187756 | A1* | 8/2005 | Montgomery et al. | 704/9 |
| 2006/0053227 | A1* | 3/2006 | Ye et al. | 709/230 |
| 2006/0288123 | A1* | 12/2006 | Vered | 709/246 |
| 2007/0100942 | A1* | 5/2007 | Lin et al. | 709/206 |
| 2007/0171938 | A1* | 7/2007 | Sohn et al. | 370/466 |
| 2007/0275740 | A1* | 11/2007 | Deutsch et al. | 455/466 |
| 2008/0147864 | A1* | 6/2008 | Drogo De Iacovo et al. | 709/226 |

FOREIGN PATENT DOCUMENTS

WO    WO 9966746 A2 *  12/1999

* cited by examiner

*Primary Examiner* — Thai Nguyen
(74) *Attorney, Agent, or Firm* — D. Kligler I.P. Services Ltd.

(57) ABSTRACT

A multimedia message adaptation system with presentation layer adaptation, including a message parser for stripping message headers, multimedia object attachments, and presentation layer information from a message received from a sending device, a device capabilities database for maintaining multimedia device capabilities information, a multimedia adaptor for identifying the recipient device, querying the device capabilities database to determine media characteristics for presenting the multimedia objects on the recipient device, and adapting the multimedia objects for presentation on the recipient device in accordance with the characteristics, a presentation layer preferences database for maintaining multimedia object presentation preferences, a presentation layer adaptor for querying presentation layer preferences to determine preferences for presenting the multimedia objects, and adapt the presentation layer in accordance with the preferences, and a message encoder for packaging the adapted multimedia objects, presentation layer information, and message headers into an adapted message for delivery to the recipient device.

24 Claims, 4 Drawing Sheets

PRESENTATION LAYER ADAPTATION IN MULTIMEDIA MESSAGING

CROSS-REFERENCE TO RELATED APPLICATIONS

This application claims the benefit of U.S. Provisional Application No. 60/685,541, filed on May 31, 2005, and incorporated herein by reference in its entirety.

FIELD OF THE INVENTION

The present invention relates to multimedia messaging systems in general, and more particularly to adapting the presentation layer in multimedia messaging.

BACKGROUND OF THE INVENTION

Multimedia messages, such as those sent using the Multimedia Messaging Service (MMS) in a mobile network, typically include one or more attachments of media objects, such as images, audio, video, or text, as well as presentation layer (PL) information which controls the presentation of media objects in the context of one or more slides, and which includes instructions regarding, among other things, the display characteristics, timing and disposition of each slide and its media objects on the device on which the message is to be presented. The multimedia message sender typically determines the PL of a multimedia message, while the receiving device is responsible for interpreting the received PL and controlling the message presentation accordingly. While multimedia messages should present in as similar a manner as possible on both sending and receiving devices, different devices have different capabilities and interpret PL instructions differently, resulting in dissimilar or otherwise deficient presentations. This may be further aggravated where the sender device employs a PL template that is not specifically suited to the media objects being sent, and that has not been modified by the person sending the message to correct this, such as when the sender PL indicates a 5-second display duration for a 10-second video clip. Techniques for minimizing presentation dissimilarities and deficiencies between different devices would therefore be advantageous.

SUMMARY OF THE INVENTION

The present invention discloses a system and method for adapting the presentation layer of a multimedia message sent to a recipient device. Presentation layer adaptations are described that consider, among other things, the nature of the message elements, including the characteristics of each media attachment, the receiving device capabilities, and predefined presentation preferences.

In one aspect of the present invention a computer-implemented multimedia message adaptation system is provided with presentation layer adaptation, the system including a message parser configured to strip any message headers, multimedia object attachments, and presentation layer information from a message received from a sending device and intended for a recipient device, a device capabilities database configured to maintain information about the capabilities of a plurality of multimedia devices, a multimedia adaptor configured to identify the recipient device, query the device capabilities database to determine possible media characteristics for presenting any of the multimedia objects on the recipient device, and adapt any of the multimedia objects for presentation on the recipient device in accordance with the characteristics, a presentation layer preferences database configured to maintain multimedia object presentation preferences, a presentation layer adaptor configured to query the presentation layer preferences database to determine possible preferences for presenting any of the multimedia objects on the recipient device, and adapt the presentation layer in accordance with the preferences, and a message encoder configured to package the adapted multimedia objects, presentation layer information, and message headers into an adapted message for delivery to the recipient device.

In another aspect of the present invention any of the presentation preferences are set at a system level for providing a uniform, system-wide presentation standard for a plurality of subscribers across a plurality of service providers.

In another aspect of the present invention any of the presentation preferences are set at a subscriber level.

In another aspect of the present invention the multimedia adaptor is configured to derive the intended recipient's subscriber-specific ID for accessing specific subscriber-level presentation preferences.

In another aspect of the present invention the device capabilities database maintains presentation layer support capabilities for the multimedia devices.

In another aspect of the present invention a presentation layer adaptor is provided including a) a presentation layer adder/remover configured to receive multimedia message input and either of a1) remove a presentation layer from a multimedia message and a2) insert a presentation layer into a multimedia message in accordance with the capabilities of a recipient device to which the message is directed, b) a device capabilities database configured to maintain information about the presentation layer support capabilities of a plurality of multimedia devices, c) an unconditional adaptations module configured to perform any of the following presentation layer adaptations c1) change the available presentation resolution in accordance with the resolution supported by the recipient device as indicated in the device capabilities database, c2) delete references to any media objects in the message that were deleted during media adaptation, c3) add references to any media objects in the message that were added during media adaptation or when the presentation layer information was added to the message, d) a presentation layer preferences database configured to maintain presentation preferences, e) an adaptation decisions module configured to query the device capabilities database and the presentation layer preferences database and obtain characteristics of the media objects to determine which adaptations may be applied to the message presentation layer for the incoming message and the recipient device, f) an adaptation execution module configured to implement all of the adaptations determined for the message's presentation layer, and g) a presentation layer encoder configured to encode the presentation layer information for incorporation into an adapted message which includes both adapted multimedia and the presentation layer information.

In another aspect of the present invention the adaptation decisions module is configured to perform a portrait media layout change by changing the layout of each object on a display screen and the relation between layout size with vertical portrait alignment.

In another aspect of the present invention the adaptation decisions module is configured to perform a landscape media layout change by changing the layout of each object on a display screen and the relation between layout size with landscape portrait alignment.

In another aspect of the present invention the adaptation decisions module is configured to dividing any of the media objects that are displayed in a single slide into two or more slides.

In another aspect of the present invention the adaptation decisions module is configured to perform timing changes in accordance with media characteristics and presentation preferences.

In another aspect of the present invention the presentation layer adaptor further includes a presentation layer parser configured to receive and parse presentation layer information associated with the multimedia message input.

In another aspect of the present invention the presentation layer adaptor further includes a slide categorization module configured to categorize each slide defined in the presentation layer to a type, where the presentation layer preferences database is configured to maintain presentation preferences for each of the slide types.

In another aspect of the present invention the presentation layer adder/remover is configured to add the presentation layer from a predefined template if no presentation layer is present in the source message.

In another aspect of the present invention the template does not include any specific references to media objects.

In another aspect of the present invention the adaptation decisions module is configured to determine adaptations to the presentation layer in accordance with a change to any of the media objects in the message.

In another aspect of the present invention the adaptation decisions module is configured to determine adaptations to the presentation layer in accordance with recipient device capabilities as indicated by the device capabilities database.

In another aspect of the present invention a computer-implemented method is provided for multimedia message adaptation with presentation layer adaptation, the method including stripping any message headers, multimedia object attachments, and presentation layer information from a message received from a sending device and intended for a recipient device, identifying the intended recipient device of the message, determining the device capabilities of the recipient device to determine possible media characteristics for presenting any of the multimedia objects on the recipient device, adapting any of the multimedia objects for presentation on the recipient device in accordance with the characteristics, determining possible presentation layer preferences for presenting any of the multimedia objects on the recipient device, adapting the presentation layer in accordance with the preferences, and packaging the adapted multimedia objects, presentation layer information, and message headers into an adapted message for delivery to the recipient device.

In another aspect of the present invention the adapting presentation layer step includes adapting to a system-level preference to provide a uniform, system-wide presentation standard for a plurality of subscribers across a plurality of service providers.

In another aspect of the present invention the adapting presentation layer step includes adapting to a subscriber-level preference.

In another aspect of the present invention the method further includes deriving the intended recipient's subscriber-specific ID for accessing specific subscriber-level presentation preferences.

In another aspect of the present invention a method is provided for adapting the presentation layer of a multimedia message, the method including a) parsing presentation layer information associated with a multimedia message intended for a recipient device, b) performing any of the following presentation layer adaptations b1) changing the available presentation resolution in accordance with the resolution supported by the recipient device, b2) deleting references to any media objects in the message that were deleted during media adaptation, b3) adding references to any media objects in the message that were added during media adaptation or when the presentation layer information was added to the message, c) determining from capabilities of the recipient device, any applicable presentation layer preferences, and characteristics of the media objects which adaptations may be applied to the message presentation layer for the message and the recipient device, d) implementing the adaptations to the presentation layer, and e) encoding the presentation layer information for incorporation into an adapted message which includes both adapted multimedia and the presentation layer information.

In another aspect of the present invention the method further includes adding the presentation layer to the message.

In another aspect of the present invention the method further includes deleting any presentation layer received from the message.

In another aspect of the present invention the method further includes categorizing each slide defined in the presentation layer to a type, where the determining step includes identifying the presentation layer preferences that are associated with each of the slide types.

In another aspect of the present invention the method further includes assigning a modifying timing tag to any of the slides, where the timing is set to the slide duration according to user preferences defined for the slide type and according to characteristics of the media objects in the slide.

In another aspect of the present invention the method further includes adding the presentation layer from a predefined template if no presentation layer is present in the source message.

In another aspect of the present invention the determining step includes determining adaptations to the presentation layer in accordance with a change to any of the media objects in the message.

In another aspect of the present invention the determining step includes determining adaptations to the presentation layer in accordance with a difference between the capabilities of the recipient device and the device capabilities indicated by the presentation layer included in the message.

It is appreciated throughout the specification and claims that references to "devices" on which multimedia messages are displayed or otherwise presented may be understood as referring to both the device hardware, such as may be a cellular telephone handset, a laptop computer, a PDA, or other device capable of presenting a multimedia message, as well as to the software client responsible for presenting the multimedia message on the device.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
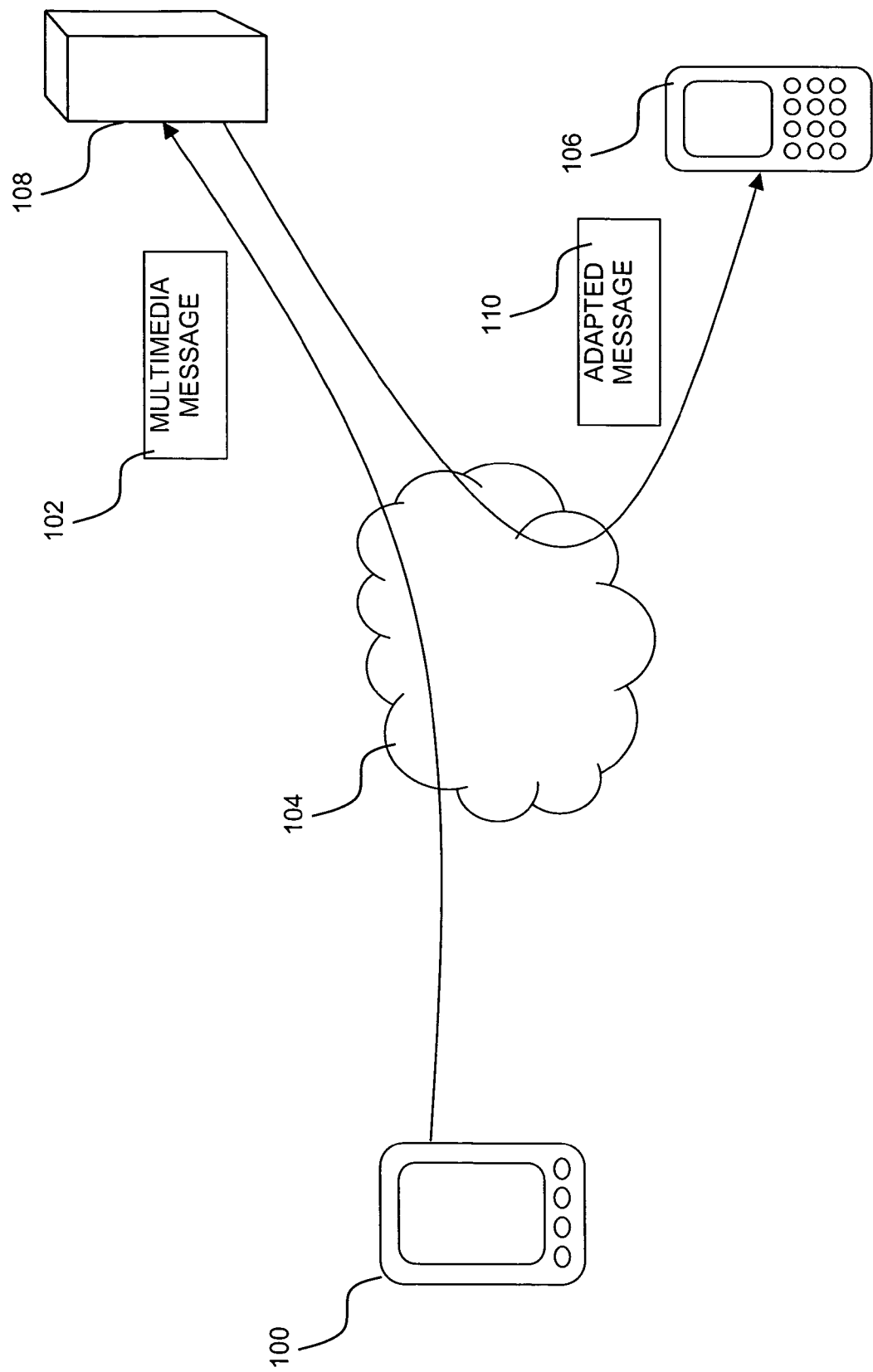
FIG. 1 is a simplified conceptual illustration of a multimedia messaging system, useful in understanding the present invention.

Reference is now made to FIG. 1, which is a simplified conceptual illustration of a multimedia messaging system with message adaptation, useful in understanding the present invention. In the system of FIG. 1, a sender device 100, such as personal digital assistant (PDA) or, a cellular telephone, or a personal computer, is used to send a multimedia message 102 via a communication network 104, such as a cellular telephone network or other network, to a receiving device 106, such as a cellular telephone or a personal computer. Message 102 typically includes one or more attachments, such as audio, video, images, or text attachments, or any combination thereof. To facilitate the delivery of message 102, sender device 100 typically sends message 102 to a messaging system 108, which may employ one or more computers to adapt any of the attachments of message 102 for presentation on receiving device 106. For example, messaging system 108 may transcode a Microsoft™ Windows Media Video™ (WMV) format attachment into the 3GP format used by many cellular telephones. Messaging system 108 then sends adapted message 110 to receiver device 106 where message 110 is presented, such as by employing a media player with which receiver device 106 is configured.

Figure 2:
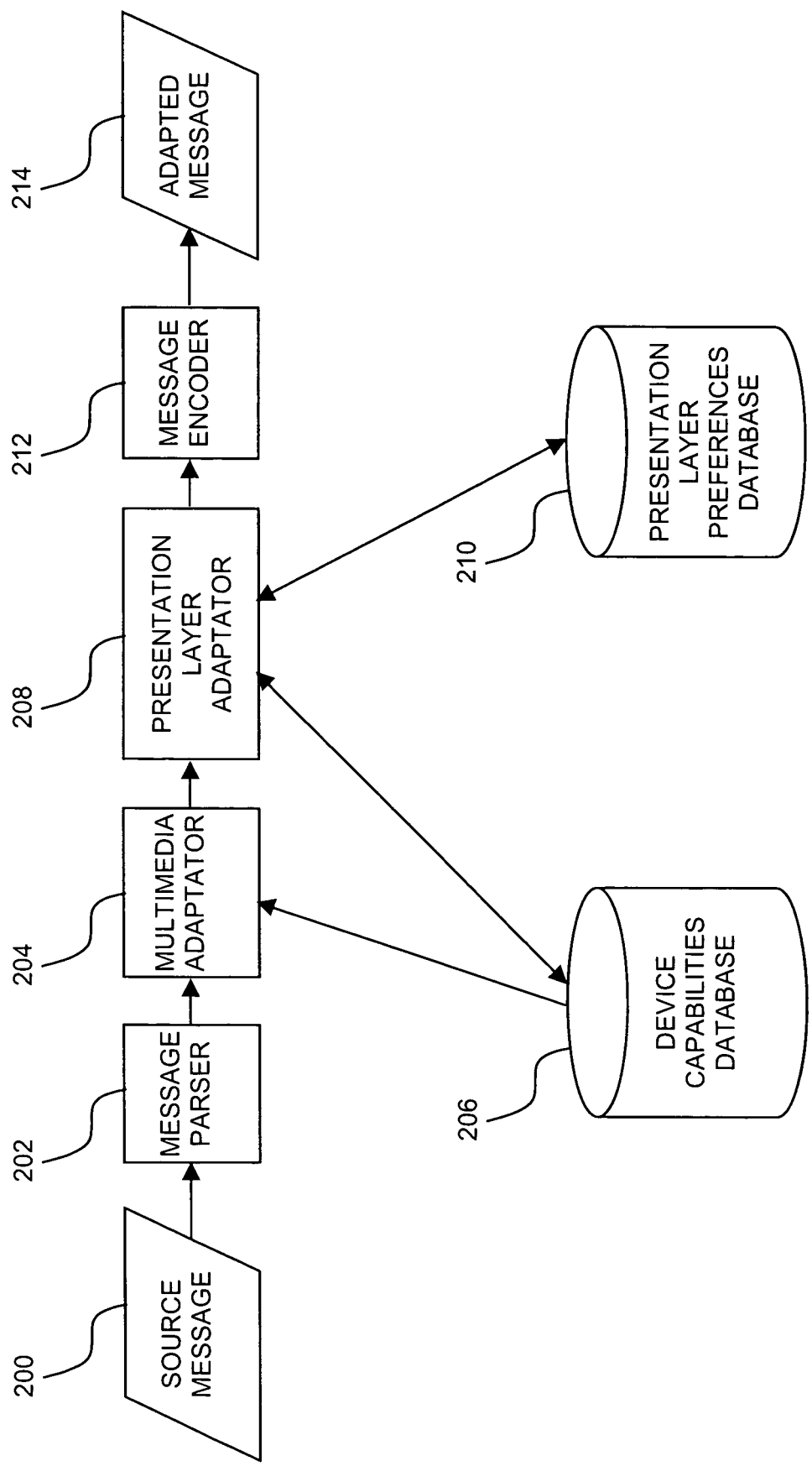
FIG. 2 is a simplified block diagram of a multimedia message adaptation system, constructed and operative in accordance with an embodiment of the present invention.

Reference is now made to FIG. 2, which is a simplified block diagram of a multimedia message adaptation system with presentation layer adaptation, constructed and operative in accordance with an embodiment of the present invention. In the system of FIG. 2, a source message 200, such as multimedia message 102 (FIG. 1), is received by a message parser 202 which preferably strips message headers, multimedia object attachments, and presentation layer information from message 200. Message parser 202 then preferably parses the headers and, using the message metadata (e.g., content-type), produces a vector of media objects, indicating the type of each media object. A multimedia adaptor 204 identifies the intended recipient's device in accordance with conventional techniques, and may derive additional information, such as the intended recipient's subscriber-specific ID (e.g., the recipient's Mobile Station Integrated Services Digital Network Number (MSISDN) which may be used to access specific subscriber preferences. Using the derived recipient device type, multimedia adaptor 204 preferably queries a device capabilities database 206 to determine possible target media characteristics for the recipient device. Device capabilities database 206 preferably maintains information about the capabilities of various multimedia devices, such as multimedia support and playing capabilities including formats supported, screen size, and maximum message size, as well as presentation layer support capabilities. After determining optimal constraints for the recipient device, multimedia adaptor 204 preferably adapts the media attachments of message 200 for presentation on the recipient device. During this process, the following information is preferably determined:

Resolution (for images, video)
Number of characters, font (for text)
Duration (for audio, video, animation)
Media format
Whether any original attachments have been deleted and/or new attachments added
Original presentation layer information, if found.

In accordance with the present invention, a presentation layer adaptor 208 and a presentation layer preferences database 210 are provided for adapting or otherwise generating presentation layer information for presenting message 200 on the recipient device. Presentation layer information may be configured according to predefined timing and layout preferences. Such preferences may be set at the system level for providing a uniform, system-wide presentation standard for all subscribers across all service providers, or at the subscriber level for greatest personalization, such as may be accessed using a subscriber-specific ID. An exemplary method of operation of presentation layer adaptor 208 is described hereinbelow with reference to FIGS. 3 and 4.

A message encoder 212 then packages the adapted media attachments, presentation layer information, and message headers into an adapted message 214 for delivery to the recipient device.

Figure 3:
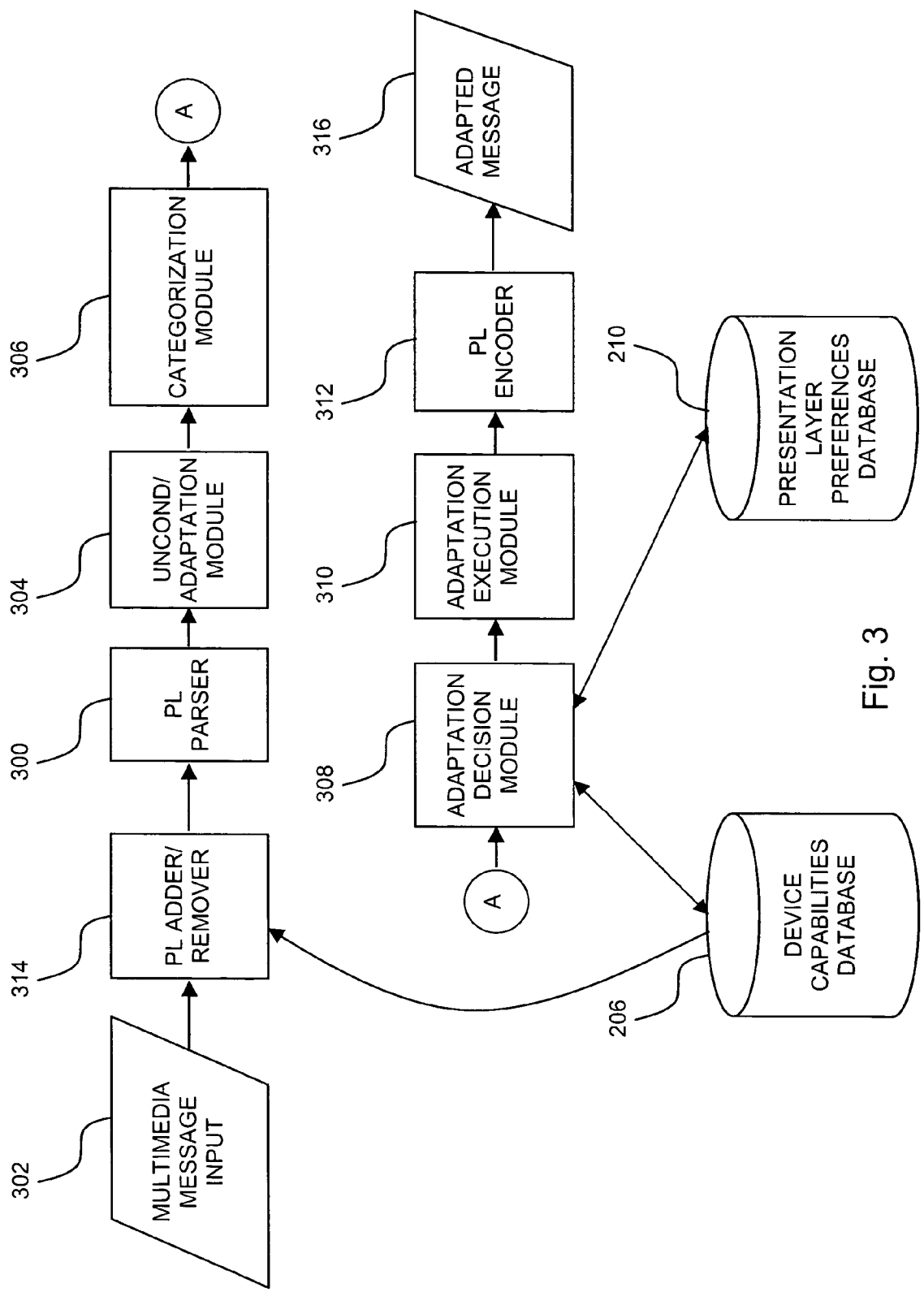
FIG. 3 is a simplified block diagram of a presentation layer adaptor, constructed and operative in accordance with an embodiment of the present invention.

Reference is now made to FIG. 3, which is a simplified block diagram of a presentation layer adaptor, constructed and operative in accordance with an embodiment of the present invention. Operation of the presentation layer adaptor of FIG. 3 preferably begins with a presentation layer adder/remover 314, which removes the presentations layer from or inserts a presentation layer into multimedia message input 302 in accordance with recipient device capabilities indicated in device capabilities database 206. Thus, for example, if device capabilities database 206 indicates that the user of the recipient device will have a better user experience if a multimedia message includes presentation layer information than if it does not, presentation layer information may be added as required, such as from a predefined template if no presentation layer is present in the source message. The template may be a general template that does not include any specific reference to media objects. Specific references may be added during presentation layer adaptation. Conversely, if device capabilities database 206 indicates that the user of the recipient device will have a worse user experience if a multimedia message includes presentation layer information than if it does not, and the original message includes presentation layer information, the presentation layer information may be removed.

In FIG. 3, a presentation layer parser 300 receives and parses presentation layer information associated with multimedia message input 302. The presentation layer information may include the following information:

| Type | Members | Description |
| --- | --- | --- |
| Presentation Layout | Height, width (e.g., in pixels) | Available screen size (resolution) for the presentation. |
| Vector of slides | Slides | |
| Slide | Duration of slide<br>List of media attachments descriptors Slide type | |
| Reference to media objects and viewing instructions | PL instructions (e.g., layout, timing, etc.)<br>Link to media attachment info | Provided by multimedia adaptor 204. |

An unconditional adaptations module 304 may perform any of the following adaptations:
1. Change available screen size (resolution) for the presentation according to the recipient device characteristics;
2. Delete references to media objects that were deleted by media adaptor 204, such as objects that were deleted due to a byte size limitation where the object is larger than the receiving device can handle;
3. Add references to media objects that were added by media adaptor 204, or when presentation layer information was added to the message using a general presentation layer template.

A slide categorization module 306 preferably categorizes each slide defined in the presentation layer to a type. The slide type is later used to select an adaptation that suits it, based on adaptation preferences. The categorization may be implemented in various ways. For example, the categorization may be performed according to the description of the media objects it contains, such as "slide with video," "slide with image and text," "slide with image and audio," etc. Alternatively, the categorization may be performed according to more generalized categories, such as "slide with single visual media," "slide with 2 visual media objects," "slide with one visual media and audio attachment," etc.

Device capabilities database 206 preferably includes information regarding device message presentation capabilities as well as information regarding the extent to which different devices support presentation layer instructions. Device capabilities database 206 may include the following information:

The "presentation player" described above refers to the device software element responsible for interpreting presentation layer information, and will typically be a multimedia message player/viewer.

Presentation layer preferences database 210 includes media object preferences, such as preferences for each specific slide type. For example, presentation layer preferences database 210 may include the following layout information:

| Preference name | Type | Comment |
| --- | --- | --- |
| Minimum acceptable size of non-text visual media object | Integer (resolution of the larger dimension - e.g., for a visual object there would be 2 dimensions: height and width. The parameter refers to the minimum acceptable size of the larger of the two.) | |
| Maximum acceptable decrease in size of non-text visual media object. | Integer - percentage. | Reduction in resolution. A value of 0 means that the visual media should be given the largest layout. Indicates the maximum acceptable decrease for a visual media object. |

| Field name | Description | Possible values/types |
| --- | --- | --- |
| Presentation layer language support | Does the device support presentation layer information? | Yes, no, restriction to specific standard language |
| Resolution of presentation player | Effective resolution for showing the presentation | Pair: Height-integer Width-integer (Pixels) |
| Text resolution in presentation player | Effective text size that fits in screen - how many characters in a row, how many rows. | Pair: Height-integer Width-integer (Characters) |
| Support of timing | Does the presentation player support timing tags, i.e. automatic switching of slides? | Yes, No |
| Support for regions | Support for "region" instructions, where a region is an area on the device display screen in which each visual media will be presented. | Full support Only in absolute values notation (pixels) Only in percentage notation (i.e. percentage of screen layout) No region support |
| Support of landscape | Does the device support landscape layout (an extension to the region support information) of objects, e.g., 2 objects horizontally adjacent, not vertically. | Yes, No |
| Support for specific media type in presentation | For each media format supported by the terminal, can the terminal play it in a presentation player, e.g. specific media formats might be viewable only as objects and not in the scope of a presentation layer. | Supported in presentation Not supported in a presentation |

Presentation layer preferences database 210 may indicate layout preferences by slide type as follows:

| Slide type | Preference name | Type | Comment |
|---|---|---|---|
| Image and text in slide<br>Video and text in slide<br>Image audio and text in one slide | Part of screen that should be allocated to non-text visual media object | Integer (percentage) | The layout allocation for the text is automatically given as compliment of this value.<br>If allocated layout is 100%, the consequence will be to split the slide into two slides. |
| Image and text in slide<br>Video and text in slide<br>Image audio and text in one slide | Allow landscape | Never use landscape<br>Always use landscape if device supports it<br>Use landscape if device supports it and fits better in screen | Allowing landscape alignment. |
| Image and text in slide<br>Video and text in slide<br>Image audio and text in one slide | In landscape, text should be: | On the right side<br>On the left side | |
| Image and text in slide<br>Video and text in slide<br>Image audio and text in one slide | In Portrait, text should be: | Above image/video<br>Below image/video | |

Presentation layer preferences database 210 may include media object timing information, such as the following timing information by slide type:

| Slide type | Timing options | Comment |
|---|---|---|
| Image and audio in slide | Choose one of the following<br>Keep original duration | |
| Image, audio and text in slide | Set duration according to clip length | |
| Video in slide | Duration = X sec, where X is set by administrator preference<br>Use maximum of (original duration, X sec) | |
| Image in slide | Keep original duration | |
| Image and text in slide | Duration = X sec<br>Use maximum of (original duration, X sec) | |
| Split slide (i.e. slide that had been adapted by the module) | Timing of each new slide should be according to the preference set (above) for the new slide type<br>Duration for first slide: X sec, for second slide: Y sec | |

An adaptation decisions module 308 uses device capabilities database 206 and presentation layer preferences database 210 to determine which adaptations should be applied to the message presentation layer for a given incoming message and recipient device. Adaptation decisions module 308 may apply adaptations that are preference-driven, adaptations that are required because of changes to media objects during the media adaptation process, and/or adaptations that are required because of device differences. Such adaptations may include:
 1. Media layout changes (portrait)—Changing the layout of each object on the screen, and the relation between layout size; portrait alignment (aligned vertically);
 2. Media layout changes (landscape)—Changing the layout of each object, and the relation between layout size; landscape alignment;
 3. Slide splitting—Dividing several media objects that are displayed in a single slide into two or more slides;
 4. Timing changes.

Adaptation decisions module 308 preferably assigns and/or modifies a timing tag for each slide, as it may do so for any media object. The timing is preferably set to the slide duration according to user preferences defined for each specific slide type, and according to characteristics of the media object (e.g., the length of media object clips in a slide).

An exemplary method of operation of adaptation decisions module 308 is described in detail hereinbelow with reference to FIG. 4.

An adaptation execution module 310 implements all adaptations determined for the message's presentation layer, whereupon a presentation layer encoder 312 encodes the presentation layer information in accordance with presentation language standards, resulting in an adapted presentation layer, which may then be incorporated into an adapted message 316, which includes both adapted multimedia and presentation layer information.

Figure 4:
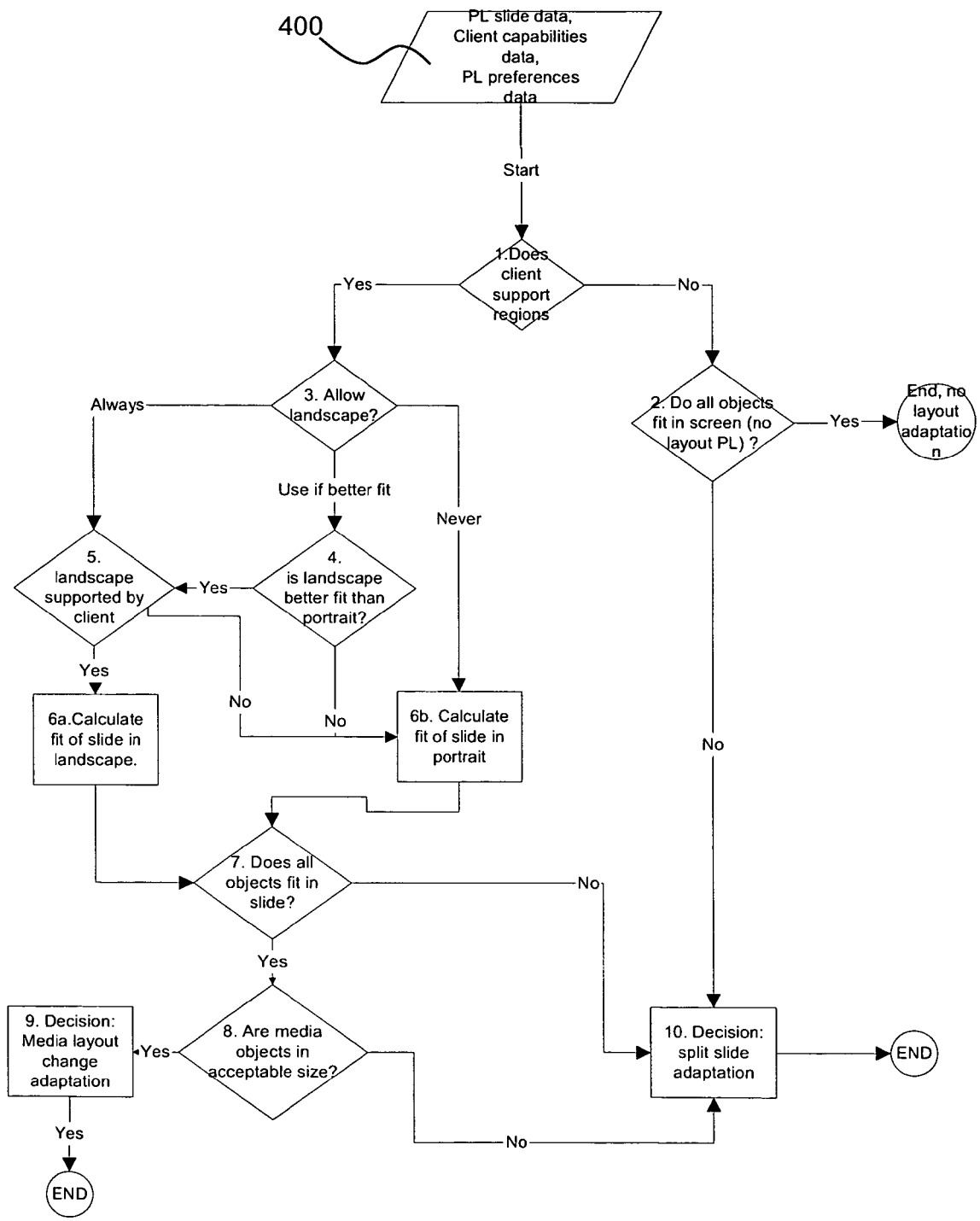
FIG. 4 is a simplified flowchart illustration of an exemplary method for presentation layer adaptation, operative in accordance with an embodiment of the present invention.

Reference is now made to FIG. 4, which is a simplified flowchart illustration of an exemplary method for presentation layer adaptation, operative in accordance with an embodiment of the present invention. In the method of FIG. 4, a multimedia message 400 is analyzed to determine the type of recipient device for which the message is intended. Presentation layer adaptation then proceeds by interrogating the device capabilities and/or media object characteristics as follows:

1. Does the device support regions? If so, go to step 3.
2. Do all media objects fit in the screen? If not, go to step 10.
   To test the condition above, calculate the device screen size needed to present the objects in portrait mode.
   a. For images and video, it may be assumed that the device can rescale any images to fit the device screen. Determine the required resolution height and width in order to preserve the image aspect ratio, restricted by the presentation player resolution.
   b. For text, calculate the required resolution height according to font size and the number of lines needed for the text. The number of characters in each line and the number of text lines are typically known aspects of the device capabilities, from which font size may be deduced.
   c. Check if the sum of the height of all objects fit within the presentation resolution. If all the objects fit, end the PL adaptation process. If not all the objects fit, go to step 10.
3. Is landscape presentation of media objects allowed, such as based on specific slide type preferences, and if the device capabilities permit? If landscape is always allowed and preferred, go to step 5. If landscape is never allowed, go to step 6b.
4. Is landscape a better fit than portrait presentation? Based on the device capabilities, such as the resolution of the presentation player, if the width of the screen that is afforded by the player resolution is greater than the height, then landscape is better fit. If not, go to step 6b.
5. Query device capabilities DB for device support of landscape. If supported, go to 6a. If not, go to step 6b.
6. Calculate fit of slide in a) landscape or b) portrait. Determine the layout of each object in the slide based on adaptation preferences, such as using the parameter "Part of screen that should be allocated to non-text visual media object."
7. Do all objects fit in the slide? If not, go to step 10.
8. Determine if each media object is of an acceptable size by:
   Calculating the size of the larger dimension (between width and height axes) of the layout area allocated to each object on the screen in the PL.
   Calculating the decrease factor (resolution) for each non-text visual media object comparing the size allocated to presenting the object on the screen with its intrinsic size, e.g., the region in which an image is presented on the screen as compared with the image resolution.
   These parameters are compared against the preference set to determine if the proposed layout of each object is acceptable.
9. Set presentation layer information to reflect the desired slide layout based on the defined preferences and the slide type.
   Layout is based on preference parameters indicating:
   a. The part of the screen that should be allocated to non-text visual media objects;
   b. In landscape, that the text should be left/right of the other objects.
   c. In portrait, that the text should be above/below the other objects.
10. Split slide adaptation. Split the slide into two new slides, such that some media objects are presented in the first new slide and some in the second, using any predefined object distribution preferences, such as may be included in presentation layer preferences database 210.

While the exemplary method of FIG. 4 describes the invention with respect to a presentation layer which allows up to two visual objects in a slide and no nesting of time containers, it is appreciated that the present invention may be employed to adapt presentation layers of different complexity and with various object configurations in accordance with any known presentation layer options.

The presentation layer adaptor and method of FIGS. 3-4 are preferably implemented using a presentation layer language that supports slide capabilities, where a slide includes one or more media objects, and may include one or more timing tags and references to the media objects to be presented in the slide, as well as layout instructions for the slide and for each of its media objects. The presentation layer may be specifically adapted for each slide where multiple slides are defined, or generally adapted for application to all slides in a message. Alternatively, the presentation layer adaptor and method of FIGS. 3-4 may support a presentation layer language that does not define slides, in which case the presentation layer is adapted to treat all of a message's media objects as if they are contained on a single slide, or, alternatively, the media objects may be split into multiple slides as described hereinabove.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software embodied in a non-transitory computer-readable storage medium using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented multimedia message adaptation system with presentation layer adaptation, the system comprising:
   a message parser configured to strip a message header, at least one multimedia object attachment, and presentation layer information from a message received from a sending device and intended for a recipient device, wherein said presentation layer information includes at least one parameter indicating how said multimedia object attachment is to be presented on said recipient device;
   a device capabilities database configured to maintain information about the capabilities of a plurality of multimedia devices;
   a multimedia adaptor configured to identify said recipient device, query said device capabilities database to determine possible media characteristics for presenting said at least one multimedia object on said recipient device, and adapt said at least one multimedia object for presentation on said recipient device in accordance with said characteristics;

a presentation layer preferences database configured to maintain predefined multimedia object presentation preferences;

a presentation layer adaptor configured to
query said presentation layer preferences database to identify a presentation layer adaptation action that is dependent on
a characteristic of said multimedia object,
a characteristic of said predefined multimedia object presentation preferences that relate to said at least one multimedia object, and
a capability of said recipient device, and
adapt said presentation layer information received with said message in accordance with said presentation layer adaptation action, thereby changing said at least one parameter indicating how said multimedia object attachment is to be presented on said recipient device; and a message encoder configured to package said at least one adapted multimedia object, said adapted presentation layer information, and said message header into an adapted message for delivery to said recipient device, and wherein said message parser, device capabilities database, multimedia adaptor, presentation layer preferences database, presentation layer adaptor, and message encoder are implemented in either of
a) computer hardware, and
b) computer software embodied in a non-transitory computer-readable storage medium.

2. The system according to claim 1 wherein at least one of said presentation preferences are set at a system level for providing a uniform, system-wide presentation standard for a plurality of subscribers across a plurality of service providers.

3. The system according to claim 1 wherein at least one of said presentation preferences are set at a subscriber level.

4. The system according to claim 1 wherein said multimedia adaptor is configured to derive the intended recipient's subscriber-specific ID for accessing specific subscriber-level presentation preferences.

5. The system according to claim 1 wherein said device capabilities database maintains presentation layer support capabilities for said multimedia devices.

6. The system according to claim 1 wherein said presentation layer adaptor is configured in accordance with said presentation layer adaptation action to perform a portrait media layout change by changing the layout of said at least one object on a display screen and the relation between layout size with vertical portrait alignment as defined in said presentation layer information.

7. The system according to claim 1 wherein said presentation layer adaptor is configured in accordance with said presentation layer adaptation action to perform a landscape media layout change by changing the layout of said at least one object on a display screen and the relation between layout size with landscape portrait alignment as defined in said presentation layer information.

8. The system according to claim 1 wherein at message includes a plurality of multimedia objects, and wherein said presentation layer adaptor is configured in accordance with said presentation layer adaptation action to divide said plurality of said multimedia objects that are displayed in a single slide into two or more slides.

9. The system according to claim 1 wherein said presentation layer adaptor is configured in accordance with said presentation layer adaptation action to perform timing changes in accordance with media characteristics and presentation preferences, wherein said timing changes affect the display duration of each of said multimedia objects.

10. The system according to claim 1 and further comprising a slide categorization module configured to categorize each slide defined in said presentation layer to a type, wherein said presentation layer preferences database is configured to maintain presentation preferences for each of said slide types.

11. The system according to claim 1 wherein said presentation layer adaptor is configured in accordance with said presentation layer adaptation action to add said presentation layer from a predefined template if no presentation layer is present in said source message.

12. The system according to claim 11 wherein said template does not include a specific reference to multimedia objects.

13. The system according to claim 1 wherein said presentation layer adaptor is configured in accordance with said presentation layer adaptation action to determine adaptations to said presentation layer in accordance with a change to any of said multimedia objects in said message.

14. The system according to claim 1
wherein said multimedia adaptor is configured to adapt said multimedia object independent of said presentation layer adapting said presentation layer information, and
wherein said presentation layer adaptor is configured to adapt said presentation layer information independent of said multimedia adaptor adapting said multimedia object.

15. A computer-implemented method for multimedia message adaptation with presentation layer adaptation, the method comprising:
stripping a message header, at least one multimedia object attachment, and presentation layer information from a message received from a sending device and intended for a recipient device, wherein said presentation layer information includes at least one parameter indicating how said multimedia object attachment is to be presented on said recipient device;
identifying the intended recipient device of said message;
determining the device capabilities of said recipient device to determine possible media characteristics for presenting said at least one multimedia object on said recipient device;
adapting said at least one multimedia object for presentation on said recipient device in accordance with said characteristics;
identifying a presentation layer adaptation action that is dependent on
a characteristic of said at least one multimedia object,
a characteristic of said predefined multimedia object presentation preferences that relate to said at least one multimedia object, and
a capability of said recipient device;
adapting said presentation layer information received with said message in accordance with said presentation layer adaptation action, thereby changing said at least one parameter indicating how said multimedia object attachment is to be presented on said recipient device; and
packaging said at least one adapted multimedia object, said adapted presentation layer information, and said message header into an adapted message for delivery to said recipient device, wherein said stripping, identifying, determining, adapting, and packaging steps are implemented in either of
a) computer hardware, and
b) computer software embodied in a non-transitory computer-readable storage medium.

16. The method according to claim 15 wherein said adapting presentation layer step comprises adapting to a system-level preference to provide a uniform, system-wide presentation standard for a plurality of subscribers across a plurality of service providers.

17. The method according to claim 15 wherein said adapting presentation layer step comprises adapting to a subscriber-level preference.

18. The method according to claim 15 and further comprising deriving the intended recipient's subscriber-specific ID for accessing specific subscriber-level presentation preferences.

19. The method according to claim 15 and further comprising categorizing each slide defined in said presentation layer to a type, wherein said determining step comprises identifying said presentation layer preferences that are associated with each of said slide types.

20. The method according to claim 15 and further comprising assigning a modifying timing tag to any of said slides, wherein said timing is set to the slide duration according to user preferences defined for said slide type and according to characteristics of the multimedia objects in said slide.

21. The method according to claim 15 and further comprising adding said presentation layer from a predefined template if no presentation layer is present in said source message.

22. The method according to claim 15 wherein said stripping step comprises stripping a plurality of multimedia objects from said message, and further comprising determining adaptations to said presentation layer in accordance with a change to a plurality of said multimedia objects in said message.

23. The method according to claim 15 and further comprising determining adaptations to said presentation layer in accordance with a difference between the capabilities of said recipient device and the device capabilities indicated by said presentation layer included in said message.

24. The method according to claim 15
wherein said step of adapting said at least one multimedia object is performed independent of said said step of adapting said presentation layer information, and
wherein said step of adapting said presentation layer information is performed independent of said said step of adapting said at least one multimedia object.

* * * * *